April 7, 1959     J. H. CRANE     2,880,945
AIRCRAFT

Filed Nov. 17, 1955     2 Sheets-Sheet 1

Inventor
Joseph H. Crane
by Watson D. Harbaugh
Attorney

April 7, 1959     J. H. CRANE     2,880,945
AIRCRAFT
Filed Nov. 17, 1955     2 Sheets-Sheet 2
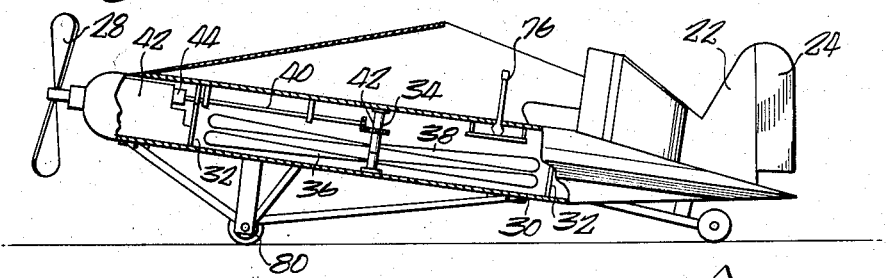
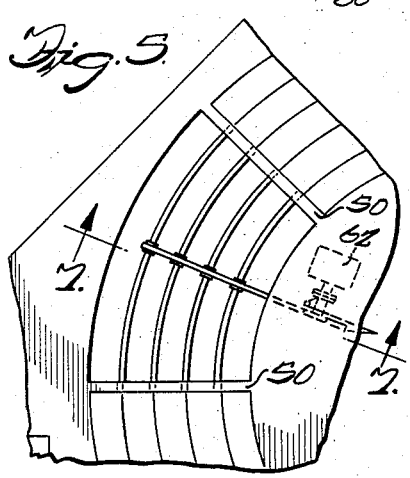
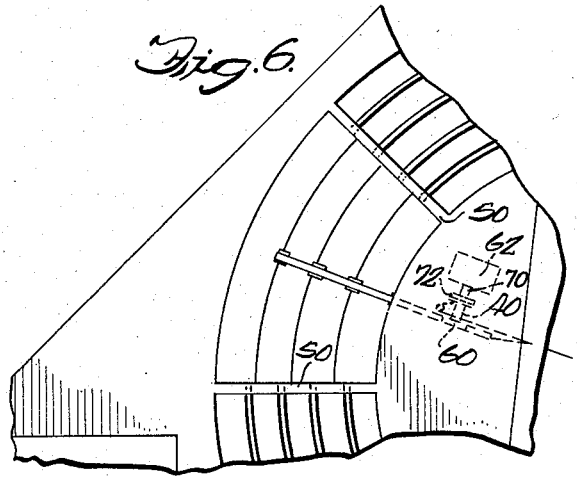
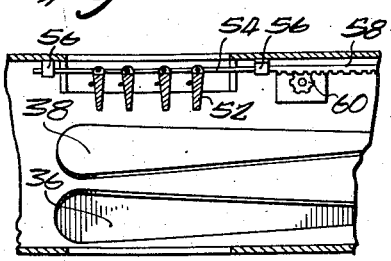
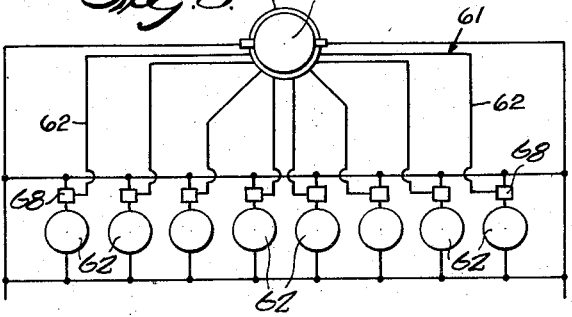
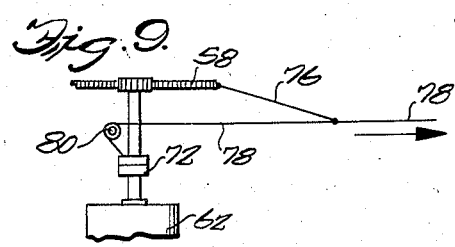
Inventor
Joseph H. Crane

United States Patent Office 2,880,945
Patented Apr. 7, 1959

2,880,945

AIRCRAFT

Joseph H. Crane, Chicago, Ill.

Application November 17, 1955, Serial No. 547,432

3 Claims. (Cl. 244—12)

This invention relates to aircraft and more particularly to an airplane which is capable of horizontal as well as vertical flight.

Conventional aircraft require expensive air fields for taking off and landing and their stability depends, to a great extent, upon the speed at which they are travelling. Helicopters, on the other hand, are capable of rising vertically and landing in the same manner, and thus, a landing area of limited extent is sufficient. One of the principal disadvantages of helicopters, however, is that they are unable to attain sufficient speeds in horizontal flight to make travel for considerable distances feasible. The main reason for this situation is, of course, that the conventional helicopter rotors are aerodynamically inefficient for horizontal flight. Various arrangements have been suggested to obviate these difficulties. It has been suggested, for instance, that an air plane be provided with sufficient power that the conventional propeller would be capable of lifting the plane vertically from a tail-on-end position. Among some other attempts to solve this problem are the so-called convertiplane which is provided with a conventionally mounted propeller for horizontal flight as well as a powered rotor which may be folded to an inoperative position while in horizontal flight. A plane of this type is still faced with the obvious disadvantage of air drag caused by the rotors even when in folded position, and, furthermore, the folding and power transmission problems have been insurmountable.

With the foregoing in mind, a principal object of the invention is to provide an aircraft which is capable of taking off and landing vertically and which is also capable of efficient horizontal flight like a conventional airplane.

Another object of the invention is to provide an aircraft of the stated type which may be balanced in a horizontal position under all conditions of flight, either vertical flight or horizontal flight.

Another object of the invention is to provide an aircraft wherein safe and efficient transition may be made between vertical and horizontal flight and vice versa.

Another object of the invention is to provide an aircraft of the vertically-rising type whose horizontal flight efficiency compares favorably with conventional aircraft and which is characterized by reduced airfoil area.

Another object of the invention is to provide an airplane of the vertically-rising type which may be balanced automatically without need for attention by the operator.

A final object of the invention is to provide an airplane of the vertically-rising type which is capable of efficient and effective operation in horizontal flight and characterized by economy of manufacture, and ease and facility of operation.

Other and further objects, advantages and features of the present invention will be apparent to those skilled in the art from the following description, taken in conjunction with the accompanying drawings in which similar reference characters relate to similar parts and in which:

Fig. 4 is an elevational view, partly broken away and partly in section, of an airplane made in accordance with the present invention;

Fig. 5 is an enlarged fragmentary plan view of vane assemblies utilized for stabilizing the airplane of Fig. 1 and showing the vanes in open position;

Fig. 6 is a view similar to Fig. 5 but showing the vane assembly in closed position;

Fig. 7 is a vertical sectional view taken substantially on line 7—7 of Fig. 5;

Fig. 8 is a schematic view of a control circuit for the vane assemblies such as shown in Figs. 5 and 6; and Fig. 9 is a diagrammatic view of an alternate mechanism for opening and closing the vane assemblies of Figs. 5 and 6.

Figure 1:
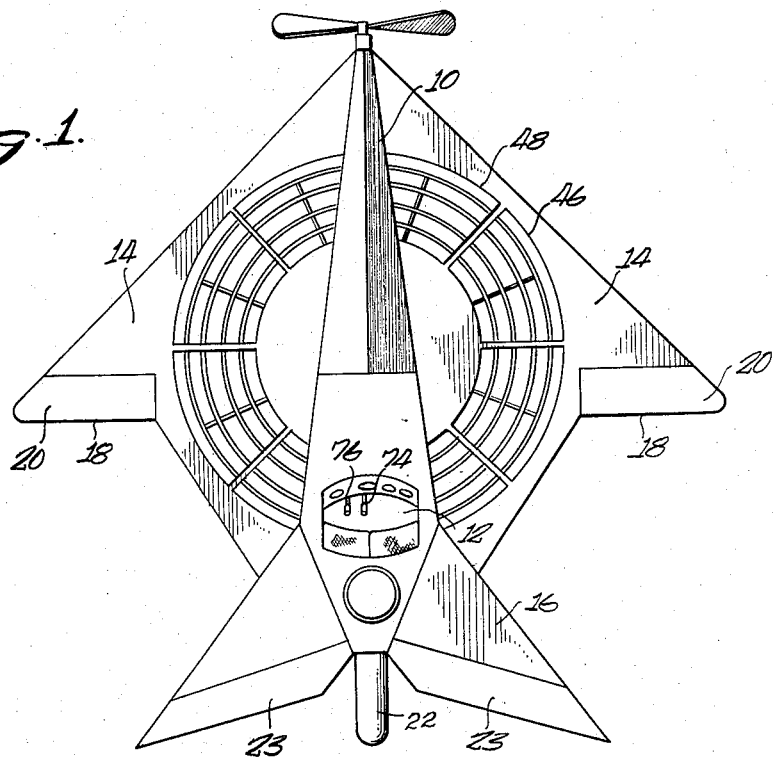
Fig. 1 is a plan view of an airplane made in accordance with the present invention.
Figure 2:
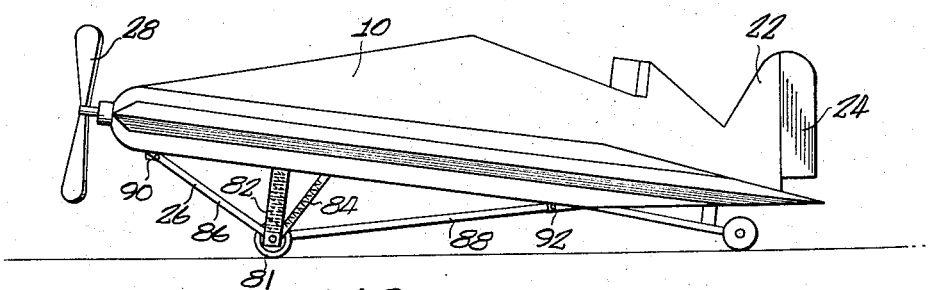
Fig. 2 is an elevational view of the airplane of Fig. 1.
Figure 3:
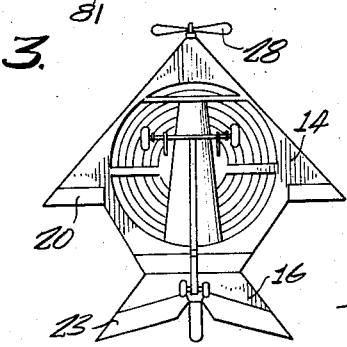
Fig. 3 is a reduced bottom plan view of the airplane of Fig. 1.

Referring now to the drawings and more particularly to Figs. 1 and 2, the airplane of the present invention comprises essentially a fuselage 10 having a cockpit 12 for the operator and wings 14 secured to the fuselage and extending rearwardly to a point adjacent the cockpit 12 where they are joined to stabilizers 16. The leading edges of the wings 14 are swept rearwardly at a sharp angle to approximately the midpoint of the fuselage 10. The trailing edges 18 of the wings 14 extend inwardly transversely of the axis of the fuselage 10 and then rearwardly at an angle to the axis of the fuselage to the point where they join the stabilizers 16. The transversely extending sections of the trailing edges are provided with flaps or ailerons 20 for controlling the climb and descent of the plane in the conventional manner. Forming a part of the fuselage 10 is a conventional tail assembly 22 having a rudder 24 for steering purposes and elevators 23 hinged to the stabilizers 16. Secured to the underside of the fuselage 10 is a resilient landing gear 26, which will be more fully hereafter described. A propeller 28 is rotatably mounted at the front or bow of the present aircraft in the conventional manner.

According to the present invention, means are provided for effecting vertical ascent of the airplane of the present invention. To this end, a well 30 is formed within the fuselage 10 and is defined by a circular wall 32. Rotatably mounted within the well 30 on a shaft 34 are a pair of counter-rotating propellers 36 and 38. These propellers are driven by means of a shaft 40 which is rotated by an engine 42. The propellers 36 and 38 are connected within the fuselage and wings and thus do not drag where the plane is in horizontal flight. Since they rotate in opposite directions undesirable torque is eliminated. The relative speeds of these propellers may be varied in the conventional way to facilitate turning. Power is transmitted to the shaft 34 through a bevel gear arrangement. A clutch 44 is provided for selectively engaging and disengaging the rotors or propellers 36 and 38. The clutch 44 may be operated from the cockpit 12 by the operator by any suitable means. The engine 42 also operates through a suitable clutching arrangement (not shown), the propeller 28 which is rotated to move the airplane through the air after it has reached a predetermined height on the air column generated by the propellers 36 and 38.

Another important feature of the present invention is the provision of means for balancing the airplane under all conditions of flight, either vertical or horizontal. In the present instance, this means takes the form of a substantially annular opening 46 formed in the wings 14. Disposed in the opening 46 are a plurality of vane assemblies 48 which are normally open while the plane is rising or descending and are normally closed while the plane is in horizontal flight. The vane assemblies 48 are segmental in character and cover completely the opening 46.

Referring now to Figs. 5, 6 and 7, a plurality of radially extending struts 50 extend across the opening 46, and in the struts are journalled vanes 52. The vanes 52 of each assembly 48 may be moved from the open position shown in Figs. 5 and 7 to the closed position shown in Fig. 6 by means of a bar 54 which is pivotally connected to each of the vanes 52 and is journalled in bearing boxes 56 depending from the undersurface of the hollow wings 14 in close relation to the marginal edges defining the opening 46. The bar 54 is actuated to the left or right, as viewed in Fig. 7, by means of a rack 58 which is driven by a pinion 60, which in turn is driven by a motor 62 which desirably is of the electric type. It will be understood that each of the vane assemblies may be selectively opened or closed by means of its respective motor 62 to vary the air intake throughout the opening 46 so that the airplane will be balanced at all times.

Referring now to Fig. 8, the operation of the motors 62 is preferably controlled by means of a gyroscope 64 which is mounted within a contact ring 66 fixedly mounted to the plane. On the inner surface of the contact ring 66 are a plurality of contacts (not shown) which are capable of selectively energizing control circuits 61 for the motors 62. Each of these control circuits include a micro-switch 68 which may be closed by energization of the control circuit resulting from engagement of the control ring contacts with a portion of the stable structure of the gyroscope itself. The contacts of the ring 66 are circumferentially spaced about the ring so that upon tilting of the aircraft in one direction a contact on the opposite side of the ring will be engaged to complete the power circuit of one of the motors 62 on that side of the airplane. When one of the motors 62 is energized, its associated pinion 60 effects radial movement of its rack 58 to propel its rod 54 outwardly to effect closing of the vane of a particular assembly.

Each motor 62 is connected to its respective pinion 60 by means of a shaft 70. Interposed between the motor 62 and the pinion 60 is a clutch 72 which may be disengaged in event of failure of the gyroscope which would render the control circuits for the respective motor 62 inoperative. In the event of such difficulty, the motor 62 may be selectively actuated by means of a control rod 74 positioned in the cockpit 12 alongside of the conventional stick 76. The control rod 74 is desirably connected to an alternate contact ring (not shown) which in turn is connected to an auxiliary control circuit similar to that shown in Fig. 8. In addition, the vane assemblies 48 may be selectively closed by hand. For this purpose, the motors 62 may be selectively disengaged from the pinion 60 through the medium of the clutches. Referring now to Fig. 9, a lanyard 76 is secured to the inner end of each of the racks 58, and to the lanyard 76 is secured a lanyard or cable 78 which passes over a fixed pulley 80 and is connected to one side of the clutch 72. The lanyard or cable 78 may be connected to the control ring operated by the control rod 74, so that in event of failure of the power circuit for the motors the vane assemblies 48 may be actuated manually.

In operation, the engine 42 and the gyroscope 64 are started, sufficient time being allowed for the gyroscope to become stabilized. The clutch 44 is then engaged and the propellers 36 and 38 are thus rotated. Of course, the vanes 52 are normally in the open position as shown in Fig. 5. Propellers 36 and 38 create a downwardly direct air current the reaction of which causes vertical rise of the airplane.

Referring again to Fig. 1, should the left hand wing 14 dip from the horizontal because of a gust of wind or the like, the relative movement between the gyroscope 64 and the contact ring 66 affords engagement with one of the contacts of the ring so that one of the control circuits is energized to close one of the micro-switches 68 and energize its associated motor 62. In the present example, the motor 62 energized would be a motor associated with one of the vane assemblies 48 on the right hand wing 14, as viewed in that figure.

The propellers 36 and 38 may be feathered from a neutral position to full thrust. By this arrangement the propeller thrust may be neutralized until the engine revolutions attain operating level, and thus a lower-powered, and hence lighter engine may be used.

Referring now to Fig. 2 the landing gear is of resilient construction to permit either vertical descent, like a helicopter, or a landing on a limited strip, like an autogiro. A pair of wheels 81 are resiliently supported on springs 82 and 84 and are held in position by struts 86 and 88 hinged to the fuselage at 90 and 92 respectively.

The aircraft of the present invention is characterized by an airfoil of limited area which is sufficient to sustain flight. This reduction in wing area effects striking economies in construction. It is contemplated that the present airplane may be fabricated of resin impregnated fiber glass which exhibits great strength per unit weight. The present craft is capable of landing and taking off from any place in which there is clearance for its dimensions.

The above-described aircraft may be operated in horizontal flight with the vertical lift propellers operating, if desired. In this event, there would be a tendency to travel in the direction in which the plane is tilted. For this purpose the control circuits 61 and the contact ring 66 may be arranged to effect an intentional tilt, as will be understood.

Although I have herein set forth a particular embodiment of the invention in considerable detail for purposes of illustration, it will be readily apparent that considerable change in these details may be made without departing from the spirit and principles of the invention, as set forth in the following claims.

I claim:

1. An airplane comprising a fuselage, wings on the sides of said fuselage, a well formed in said fuselage and said wings, a pair of coaxially mounted counter-rotating propellers arranged in said well, power means for rotating said propellers to afford vertical flight, a propeller mounted for rotation about a horizontal axis to afford horizontal flight, said power means being selectively operable to rotate said last-named propeller, and means for selectively varying the propulsive effect of said first-named propellers to afford balance under all operating conditions, said means for selectively varying the propulsive effect of the propellers comprising a substantially annular opening formed in said wings and communicating with said well, a plurality of vane assemblies mounted in said opening, means for selectively closing particular vane assemblies to control the quantity of intake air drawn into said well at a particular point, said last-named means comprising an electric motor for each vane assembly and a gyroscope having a predetermined axis of rotation, a plurality of switches actuated separately by the gyroscope and said fuselage upon relative movement between them for selectively energizing said motors to close certain of said vane assemblies to decrease the air intake at particular points of said opening thereby to obtain balance.

2. An airplane comprising a fuselage, wings on the sides of said fuselage, a well formed in said fuselage and said wings, a pair of coaxially mounted counter-rotating propellers arranged in said well, power means for rotating said propellers to afford vertical flight, a propeller mounted for rotation about a horizontal axis to afford horizontal flight, said power means being selectively operable to rotate said last-named propeller, and means for selectively varying the propulsive effect of said first-named propellers to afford balance under all operating conditions, said means for selectively varying the propulsive effect of the propellers comprising a substantially annular opening formed in said wings and communicating with said well, a plurality of vane assemblies mounted in said opening, said assemblies including a plurality of arcuate vanes, means for selectively closing the vanes of particular assemblies to control the quantity of intake air drawn into said well at a particular point, said last-named means comprising an electric motor for each vane assembly, a gyroscope and a ring having a plurality of circumferentially spaced electrical contacts engageable upon relative angular movement between the gyroscope and the ring selectively to energize said electrical motors.

3. An airplane comprising a fuselage, wings on the sides of said fuselage, a well formed in said fuselage and said wings, a pair of coaxially mounted counter-rotating propellers arranged in said well, power means for rotating said propellers to afford vertical flight, a propeller mounted for rotation about a horizontal axis to afford horizontal flight, said power means being selectively operable to rotate said last-named propeller, and means for selectively varying the propulsive effect of said first-named propellers to afford balance under all operating conditions, said means for selectively varying the propulsive effect of the propellers comprising a substantially annular opening formed in said wings and communicating with said well, a plurality of vane assemblies mounted in said opening, a first means for selectively closing particular vane assemblies to control the quantity of intake air drawn into said well at a particular point, said last-named means including a gyroscope, a contact ring therefor and a plurality of electrical control circuits including electric motors energizable upon relative movement of said gyroscope and said contact ring, said ring having a plurality of circumferentially spaced contacts adapted to be selectively engaged for energization of said electric motors, said motors being operable to open and close said vane assemblies, and alternate means for opening and closing said vane assemblies, said alternate means comprising a manually actuatable control bar for selectively energizing said motors.

References Cited in the file of this patent
UNITED STATES PATENTS

| 1,877,902 | Kuethe | Sept. 20, 1932 |
| 2,270,875 | Hanson | Jan. 27, 1942 |
| 2,461,435 | Neumann | Feb. 8, 1949 |
| 2,567,392 | Naught | Sept. 11, 1951 |